March 2, 1954     J. GRIEP     2,670,795
PUNCH DEVICE FOR CUTTING IRREGULAR HOLES
Filed Aug. 6, 1948     2 Sheets-Sheet 1

INVENTOR.
John Griep
BY
Harness, Dickey & Pierce
ATTORNEYS.

March 2, 1954 J. GRIEP 2,670,795
PUNCH DEVICE FOR CUTTING IRREGULAR HOLES
Filed Aug. 6, 1948 2 Sheets-Sheet 2
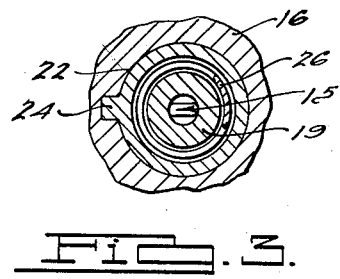
Fig. 3.
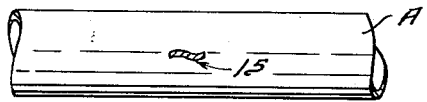
Fig. 4.
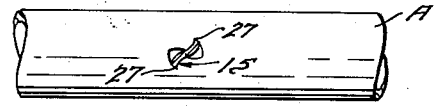
Fig. 5.
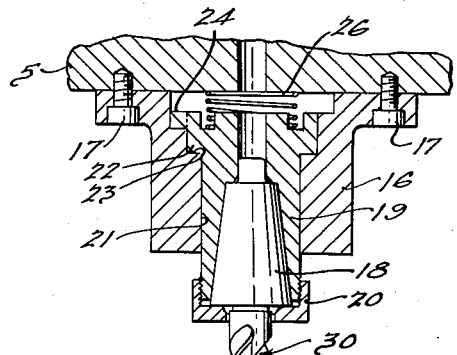
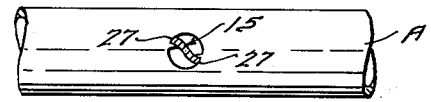
Fig. 6.
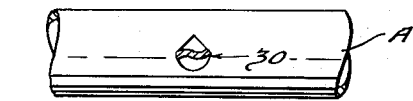
Fig. 11.
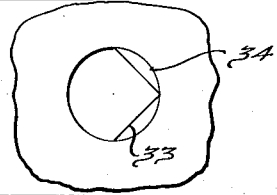
Fig. 8.
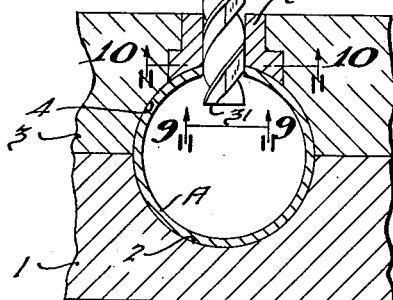
Fig. 7.
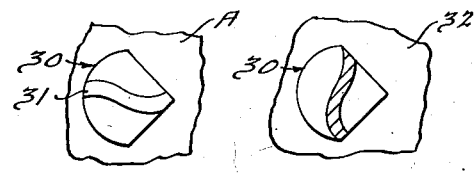
Fig. 9. Fig. 10.
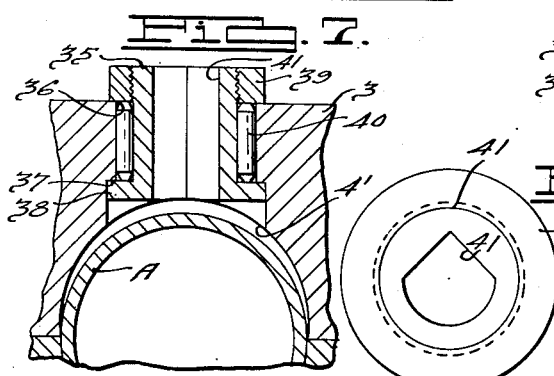
Fig. 12. Fig. 13.
INVENTOR.
John Griep.
BY
Harness, Dickey & Pierce
ATTORN Patented Mar. 2, 1954

2,670,795

UNITED STATES PATENT OFFICE 2,670,795

PUNCH DEVICE FOR CUTTING IRREGULAR HOLES

John Griep, Lincoln Park, Mich.

Application August 6, 1948, Serial No. 42,995

6 Claims. (Cl. 164—11)

This invention relates to apparatus for forming holes in thin material which is susceptible to buckling or indentation as a result of the hole-forming forces. A particularly important application of the invention is the formation of blind apertures in hollow members such as in a wall of thin tubing.

As is well known, circular holes are ordinarily formed by means of a drilling operation and noncircular holes in thin parts by means of a species of punching operation; i. e., an operation in which the hole-forming tool is non-rotatable. In both cases the tool is fed toward and into the workpiece to form the hole whereupon the direction of movement is reversed and the tool is withdrawn through the hole thus formed. Very often the workpiece is incapable of withstanding the normal forces applied thereto during feed motion of the tool and it buckles in the direction of feed to such an extent that it is permanently deformed. In almost every case the edges of the hole are deformed in the direction of feed so that they are ragged or burred. These defects are not removed by the subsequent withdrawal of the tool which simply passes through the hole formed without transferring force to the workpiece. Buckling and burring are especially troublesome when hollow members are machined, since it is often impossible to insert a tool within the member to remove the ragged edges or to force a deformed wall back into its prehole position.

The foregoing undesirable consequences have always been associated with conventional hole-forming practices and have come to be regarded as necessary evils incidental to the formation of holes in thin material. It is the important object of this invention to provide a mechanism which forms holes without these accepted but nonetheless undesirable consequences.

A further object is to provide a mechanism which forms holes of any desired shape, circular or irregular, without burring or buckling of the workpiece.

The unusual principles and features of construction whereby these and other objects of the invention are accomplished will become apparent upon consideration of an embodiment thereof as shown in the drawings, in which:

Fig. 3 is a cross section along the line 3—3 of Fig. 2 and shows means for preventing rotation of the tool when the desired hole is being formed;

Fig. 4 is a plan view of a tube having a hole formed therein by the mechanism of this invention in which the tool is shown in cross section as it enters or is fed into the tube;

Fig. 5 is a view similar to that of Fig. 4 showing the tool in cross section and also the hole which has been formed by partial withdrawal of the tool from the tube;

Fig. 6 is a view similar to that of Fig. 5 but shows nearly complete withdrawal of the tube and the formation of a circular hole;

Fig. 7 is a section similar to that of Fig. 2 but shows a different form of tool for forming an irregular hole of predetermined shape;

Fig. 8 is a plan view of the guide bushing of Fig. 7;

Fig. 9 shows an end view of the tool of Fig. 7 and Fig. 10 a cross section taken along the line 10—10 thereof;

Fig. 11 is a view similar to Fig. 6 but shows the formation of an irregular hole by the tool of Fig. 7;

Fig. 12 is a cross section through a portion of the support means for a tube and shows one form of guide bushing for a tool which produces irregular holes; and Fig. 13 is a plan view of the bushing of Fig. 12.

Figure 1:
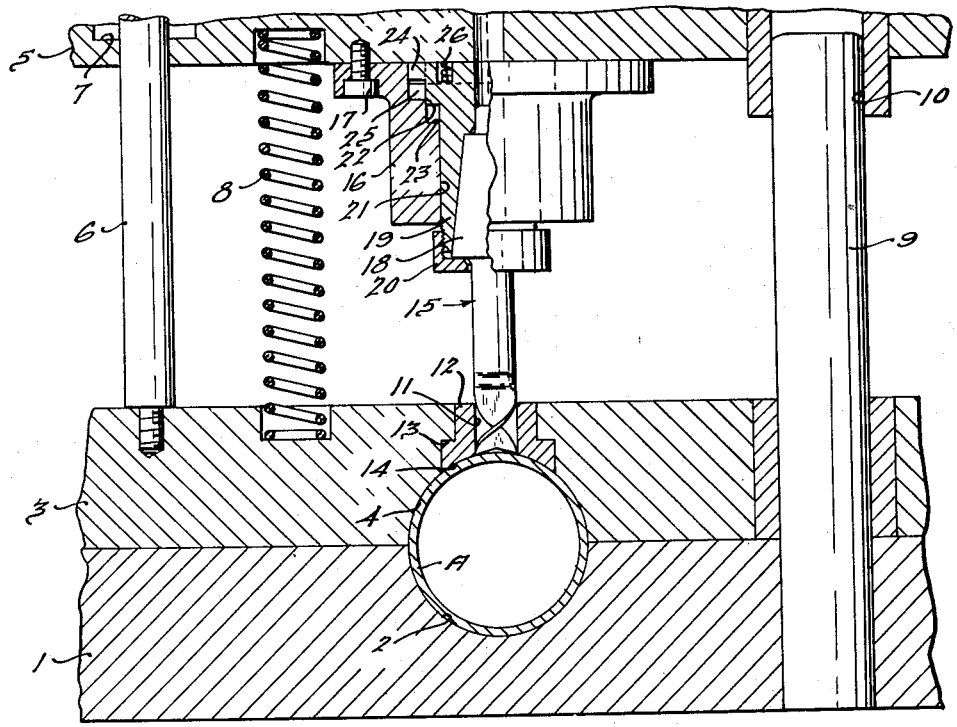
Figure 1 is a cross section with parts broken away through a mechanism embodying the invention and shows the hole-forming tool in contact with a tube immediately prior to the formation of a hole.

In the drawings the invention is employed for the production of blind holes in a tube A. Suitable support means of any desired design are provided for the tube A and may conveniently include a fixed lower die shoe I having a suitably shaped channel or groove 2 opening into the upper surface thereof to receive and support the entire lower periphery of the tube A. The support means may also include a stripper plate 3 having a suitably shaped channel 4 opening into the lower surface thereof to receive and support the upper portion of the periphery of tube A which is not received in groove 2. It will be recognized that since the stripper plate 3 is normally in engagement with the lower die shoe I, means must be provided for moving it relatively thereto in order to remove and insert tubes in the channel 2. For this purpose the stripper plate 3 is connected in a conventional manner to a movable head or upper die shoe 5 by means of one or more stripper bolts 6 which are threaded in the plate 3 and have heads (not shown) with a lost-motion abutment connection with the bottom of counterbores 7 in the head 5. After the head has moved a predetermined distance away from the lower die shoe 1, this connection will become operative to lift the stripper plate 3 from the shoe 1. In the meantime one or more compression springs 8 between the stripper plate 3 and the head 5 hold the plate in engagement with the lower die shoe 1. Proper alignment between the stripper plate 3 and shoe 1 is assured by the guide post 9 which is fixed in the shoe 1, extends through plate 3, and is slidably received by a suitable bore 10 in the head 5.

The stripper plate 3 has a guide bore 11 therein for the hole-forming tool and this is preferably provided by a guide bushing 12 which, in the preferred form, is pressed into a suitable shouldered recess 13 in the plate 3 and has a lower surface 14 contoured to blend with and form a portion of the tube-receiving channel 4. In Figs. 1–6 inclusive the invention is adapted to form circular holes; hence for reasons which will become more apparent hereinafter, the bore 11 is preferably circular and uniform in cross section.

The tool 15 is carried by the head 5 and, as suggested, is slidable in bore 11. While the stripper plate 3 is also carried by the head 5, it will be recognized that because of the spring 8 the tool and head may continue to move toward the tube A when the plate 3 is prevented from doing so by abutment with lower die shoe 1. Because of the conventional-type lost-motion connection between the plate 3 and head 5 furnished by the bolt 6, the tool 15 and head 5 move away from the tube A before sufficient force is applied to spring 8 to allow the stripper plate 3 to so move. Thus the tool 15 is capable of movement relative to the plate 3 which permits it to be fed into the tube and withdrawn therefrom while the plate 3 is stationary and serving to hold the tube A in fixed position.

The tool 15 and the feed or initial penetrating motion thereof are designed to apply a minimum force to the exterior of the tube. In contrast with conventional hole-forming practice the desired hole shape is not produced by the bottom end of the tool on the downward or feed stroke. Instead it is produced by the marginal surface of the tool on the upstroke or upon withdrawal of the tool. In this invention the hole produced on the down or "push" stroke is much smaller than the final hole, and for this reason the forces applied are less than in ordinary practice and so consequently is the deformation of the tube A or other workpiece. If any downward deformation or burring occurs on the feed storke, it is removed by the subsequent upward hole-forming movement of the tool 15. Upward deformation is prevented by contact with the lower surface 14 of the guide bushing 12, and if any burred edges should be obtained they can be easily cleaned up, since they are on the exterior of the tube.

The tool 15 embodies characteristics of both a drill and a punch. The body or operative portion of the tool 15, like a two-plate drill, has substantially helical lands or is of torsade or convolute form and may be thought of as formed by twisting a thin strip of material in spiral shape about its longitudinal axis, though actually the tool of this invention may be formed by machining, casting, or any other desired means. It will be recognized that a tool of this shape is considerably larger in end elevation than it is in any cross section; i. e., the projected area of the operative portion of the tool is much greater than its cross-sectional or web area at any longitudinal point. It will also be recognized that by rotating the tool it can be passed through an aperture no larger than its maximum cross section and thus through an aperture which is much smaller than the projected area of the tool. However, if the tool is not rotated, an aperture of the size of its projected area or end elevation must be provided for its passage. These principles are incorporated into the present invention so that a tool 15 of torsade form with a projected area having the size and shape of the desired hole is rotatably pushed through a small aperture which it punches on the feed stroke, into or through the workpiece, and then non-rotatably withdrawn or pulled therefrom to form the desired hole on the return stroke.

The tool 15 is connected to the head 5 in such a manner that it is free to rotate on the push or feed stroke but is locked against rotation on the return or pull stroke. The connecting means for this purpose may include the usual retainer 16 which is secured to the underside of the head 5 by bolts 17 or other suitable means. The shank 18 of the tool 15 may be tapered, if desired, and inserted in a tapered bore in a bushing 19 and the tool fixedly joined to the bushing by means of a lock nut 20 threaded thereon and engaged with a shoulder on the shank. The bushing 19 is slidable within the retainer bore 21 and has a radial flange 22 which seats on a radial shoulder 23 provided about the bore 21 to limit downward movement of the bushing 19 and tool 15 relative to the retainer 16. Above the flange 22 the bushing 19 has a radial lug 24 which is cooperable with a radial recess 25 in the retainer 16 to prevent rotation of the bushing 19 and tool 15 relative to the retainer. In case a symmetrical hole is formed, two lugs may be used if desired. A spring 26 between the top of bushing 19 and the lower side of the head 5 yieldably urges the bushing 19 toward its seated position on shoulder 23.

Figure 2:
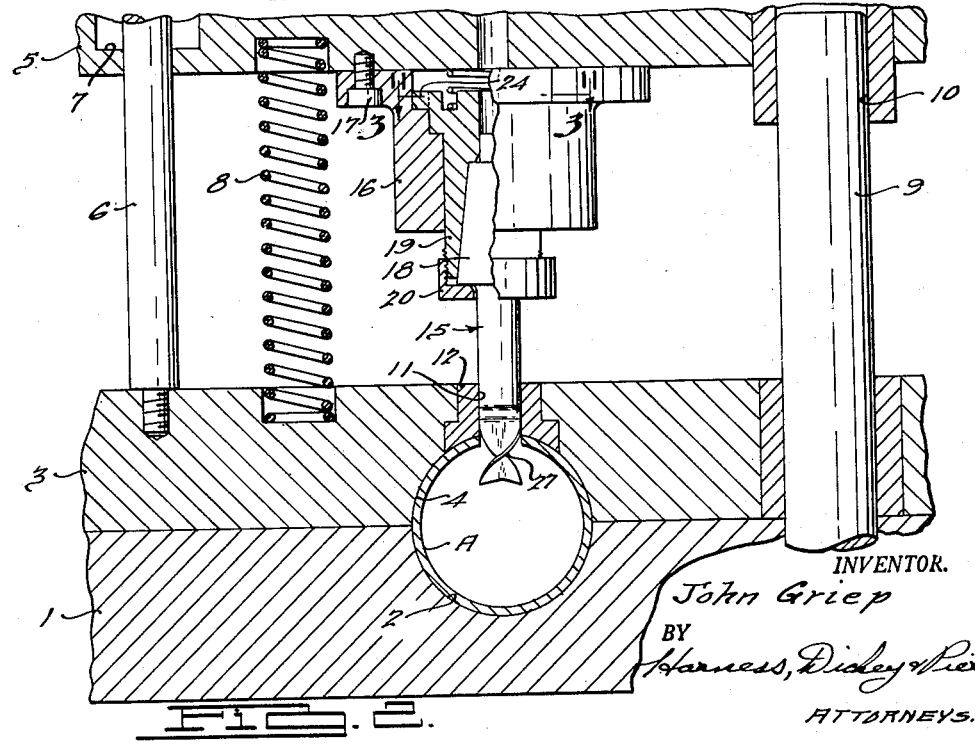
Fig. 2 is a section similar to that of Fig. 1 but shows the tool within the tube immediately prior to the formation of the desired hole shape.

In operation, the head 5 is forced downwardly, carrying with it the tool 15 which passes through the guide bore 11 and engages the surface of the tube A. Additional pressure by the head is transmitted upwardly through the bushing 19 to compress the spring 26 and move the lug 24 out of the recess 25 whereupon the bushing 19 and the tool 15 are free to rotate in the bore 21 of the retainer. Additional pressure pushes the end cross section of the tool 15 through the wall of the tube A to form an aperture such as shown in Fig. 4, and since the tool is rotatable it threads or twists its way through this aperture until the end of the feed or down stroke as shown in Fig. 2. On the upstroke, movement of head 5 is transmitted by the retainer 16 to either the lug 24 or flange 22 of the bushing 19, and the tool 15 rotates, if necessary, until the lug 24 fits in the recess 25 whereupon the tool is locked against further rotary movement. As further upward movement of the head 5 continues, the tool 15 is pulled thereby but is unable to escape through the small aperture originally formed. The marginal edges 27 of the lands, which are preferably sharpened or ground in accordance with conventional teachings so as to be capable of cutting on the upper or shank side of the lands, therefore commence to shear the tube and form a hole as shown in Figs. 5 and 6. It will be recognized that this is a gradual but continuous process very similar to the action of a can opener. After the tool 15 has moved upwardly a distance equal to one-half the pitch of its lands, the hole will be completed, and, as explained hereinbefore, any indentation produced with the original hole will be removed. Continued upward movement of the head withdraws the tool 15 from the bore 11 and raises the stripper plate 3 so that the machined tube may be removed and a new one inserted and the hole-forming operation repeated.

As may be easily observed in Fig. 6 and as elsewhere indicated, the hole produced by the tool 15 which has been described is circular. However, any shape hole may be produced by forming a torsade-type tool so that its projected area corresponds to the desired hole. Thus, in order to produce the non-circular hole of Fig. 11, an ordinary circular drill comprising the tool 30 of Figure 7 is provided, by lengthwise machining of its lands, with converging flat surfaces. The projected area or end elevation, as shown in Figure 9, of the tool 30 conforms to the desired hole shape, but as shown in Figs. 9, 10 and 11, the web section is much smaller; hence the tool 30 may be rotatably pushed into and nonrotatably pulled from the tube to produce the hole shown in Fig. 11 in the same manner as has been described in connection with the operation of tool 15.

When irregularly shaped holes are produced, the tool 30 should be designed so that the cross section of its bottom end 31 corresponds to the maximum width of the hole to be produced. Thus the aperture initially formed on the down stroke will be of sufficient size to pass all cross sections of the tool.

It is desirable to provide the guide bushing 32 with a bore having at least a lower opening 33 which is the same shape as the desired hole. The upper section of the bore may be a cylindrical counterbore 34 as indicated best in Fig. 8.

As a desirable modification for the formation of irregular holes, a guide bushing 35 may be provided, as shown in Figs. 12 and 13, which is rotatably mounted in the stripper plate 3. For this purpose the plate 3 is provided with a bore 36 having a radial enlargement to form a downwardly presenting shoulder 37. The guide bushing 35 has a radial flange 38 which is pressed against the shoulder 37 by a lock nut 39 which is threaded on its upper end and bears upon the upper surface of the plate 3. Needle bearings 40 are inserted between the bore 36 and the exterior of the bushing 35 to rotatably carry the latter and, if required, suitable thrust bearings (not shown) may also be provided. The bottom of the bushing 35 is plane so that in the application shown it can rotate freely. Preferably, the channel 4' in the plate 3 is formed on a somewhat larger radius than the tube A and the bottom of the bushing disposed tangent thereto so that in the absence of upward forces on the tube A the tube and bushing 35 are not in engagement.

The guide bushing 35 is provided with a bore 41 which is of the same shape in the end elevation of the tool 30 as the desired hole. It will be recognized that on the feed or push stroke of the tool the bushing 35 will rotate with the tool 30. This takes place freely because the bottom of the bushing is not in engagement with the tube A. On the return or pull stroke the tool 30 is nonrotatable and the tube A is lifted into engagement with the channel 4' to prevent any outward deformation as the tool forms the desired hole.

It will be apparent that the specific structure herein described may be widely modified without departing from the spirit of the invention. As indicated, any desired hole shape may be produced by following the teachings set forth above, and, of course, several holes may be formed conjointly.

I claim:

1. A hole-forming mechanism comprising support means for a workpiece, a reciprocable head movable toward or away from the support means, a rotatable punch, means mounting the punch on the head for free rotation about an axis parallel to the direction of reciprocation upon said punch contacting the workpiece as it moves toward said support, said means comprising a rotary and movable bushing, and means for preventing rotation of the punch when the head moves away from the support means, said last means comprising a key and slot connection between the bushing and head and engageable upon axial movement of the bushing to prevent rotation of the bushing.

2. A hole-forming mechanism comprising support means for a workpiece, a reciprocable head movable toward or away from the support means, a rotatable torsade-type punch, means mounting the punch on the head for free rotation about an axis parallel to the direction of reciprocation upon said punch contacting the workpiece as it moves toward said support, and means for preventing rotation of the punch when the head moves away from the support means, said mounting means and punch having limited longitudinal movement relative to said head, said rotation preventing means comprising stop means operatively engaged with the mounting means upon predetermined longitudinal movement of the mounting means away from said head.

3. In a non-circular hole-forming mechanism having a movable head and support means for a workpiece spaced from the head, the combination of a hole-forming tool of torsade form having an operative portion in which the cross-sectional areas are smaller than the area of the end elevation and the end cross section is at least equal to the maximum cross-sectional area; and means mounting the tool on the head for reciprocable movement, said means including a connection between the tool and head permitting free rotary movement of the tool relative to the head as the head and tool move toward the support means, means operated by a pull on the tool for locking the tool against rotation when the head moves away from the support means, said operative portion being adapted to shear the workpiece when the tool moves away from the workpiece and said end elevation being non-circular.

4. In a hole-forming mechanism having a movable head and support means for a workpiece spaced from the head, the combination of a tool retainer affixed to the head, a tool-carrying bushing slidably and rotatably connected to the retainer for motion along and about the tool axis relative to the head, resilient means urging the bushing to slide away from the head, means for preventing rotation of the bushing operative when the bushing receives no axial load from the head and slides under axial load on the tool toward said head and inoperative when the bushing receives an axial load from the head great enough to overcome the resilient means, and a tool carried by the bushing, said tool having substantially helical flutes and cross sections smaller than the end elevation, the end elevation being of the desired hole shape and the lengthwise edges of the tool being adapted to shear the workpiece when the head moves away from the support means.

5. A hole-forming mechanism comprising support means for a workpiece, a reciprocable head movable toward or away from the support means, a rotatable torsade-type tool, means mounting the tool on the head for reciprocable movement, said means including a connection between the tool and head permitting free rotary movement of the tool relative to the head as the head and tool move toward the support means, means operated by a pull on the tool for locking the tool against rotation when the head moves away from the support means, and means providing a guide bore for the tool, said bore having an opening adjacent the workpiece of the shape of the end elevation of the tool and the balance of the bore being of cylindrical shape.

6. A hole-forming mechanism comprising support means for a workpiece, a reciprocable head movable toward or away from the support means, a rotatable torsade-type tool, means mounting the tool on the head for reciprocable movement, said means including a connection between the tool and head permitting free rotary movement of the tool relative to the head as the head and tool move toward the support means, said last means being operated by a pull on the tool, means for locking the tool against rotation when the head moves away from the support means, and a rotatable guide bushing for the tool having a guide bore of the shape of the tool periphery.

JOHN GRIEP.

References Cited in the file of this patent

UNITED STATES PATENTS

| Number | Name | Date |
|---|---|---|
| 547,880 | Fowler | Oct. 15, 1895 |
| 1,964,030 | Brush | June 26, 1934 |
| 2,165,396 | Mansfield | July 11, 1939 |
| 2,243,614 | Vogel | May 27, 1941 |
| 2,296,087 | Burns | Sept. 15, 1942 |
| 2,389,909 | Hofbauer | Nov. 27, 1945 |